US011250525B2

(12) United States Patent
Haldane

(10) Patent No.: US 11,250,525 B2
(45) Date of Patent: Feb. 15, 2022

(54) SYSTEMS AND METHODS FOR COLLABORATIVE REAL-TIME GENERATION OF ELECTRONIC REAL ESTATE REPORTS

(71) Applicant: Appraisers Now Ltd., Red Deer (CA)

(72) Inventor: Marty Haldane, Red Deer (CA)

(73) Assignee: Appraisers Now Ltd., Alberta (CA)

(*) Notice: Subject to any disclaimer, the term of this patent is extended or adjusted under 35 U.S.C. 154(b) by 0 days.

(21) Appl. No.: 16/570,324

(22) Filed: Sep. 13, 2019

(65) Prior Publication Data

US 2020/0090287 A1    Mar. 19, 2020

Related U.S. Application Data

(60) Provisional application No. 62/731,669, filed on Sep. 14, 2018.

(51) Int. Cl.

| | |
|---|---|
| *G06Q 50/16* | (2012.01) |
| *G06F 3/14* | (2006.01) |
| *G06Q 10/10* | (2012.01) |
| *G06F 40/174* | (2020.01) |
| *G06F 40/166* | (2020.01) |
| *G06F 40/197* | (2020.01) |
| *G06F 40/169* | (2020.01) |

(52) U.S. Cl.
CPC ........... *G06Q 50/16* (2013.01); *G06F 3/1454* (2013.01); *G06F 40/166* (2020.01); *G06F 40/169* (2020.01); *G06F 40/174* (2020.01); *G06F 40/197* (2020.01); *G06Q 10/103* (2013.01)

(58) Field of Classification Search
CPC .... G06F 40/166; G06F 40/169; G06F 40/197; G06F 40/174; G06F 2216/15; G06F 3/1454; G06Q 10/103; G06Q 50/16
See application file for complete search history.

(56) References Cited

U.S. PATENT DOCUMENTS

| | | | | |
|---|---|---|---|---|
| 2012/0136800 | A1* | 5/2012 | Caballero | G06Q 30/0277 705/313 |
| 2013/0054976 | A1* | 2/2013 | Brown | H04L 9/0863 713/189 |
| 2013/0339847 | A1* | 12/2013 | Bartek | G06F 40/166 715/255 |
| 2014/0040072 | A1* | 2/2014 | Leavy | G06Q 50/16 705/26.61 |

(Continued)

*Primary Examiner* — Chau T Nguyen
(74) *Attorney, Agent, or Firm* — Bookoff McAndrews, PLLC

(57) ABSTRACT

Disclosed are methods and systems for real-time collaborative production of real estate reports. A method, for instance, may include: generating a real estate appraisal report editable by a plurality of client devices, the appraisal report having a plurality of editable fields for describing a real estate property; and, while the plurality of client devices are concurrently executing client applications enabling the appraisal report to be edited by respective users of the plurality of client devices, receiving, from a first client device among the plurality of client devices, an edit to a field among the plurality of editable fields, and in response to receiving the edit, transmitting, in real-time, the edit to a second client device among the plurality of client devices so that the edit to the field is displayed on the second client device in real time.

20 Claims, 13 Drawing Sheets

(56) References Cited

U.S. PATENT DOCUMENTS

| | | | | |
|---|---|---|---|---|
| 2016/0080512 A1* | 3/2016 | Aghadavoodi | ..... | G06F 16/9535 709/206 |
| 2018/0150925 A1* | 5/2018 | Logan | ..... | G06Q 50/16 |
| 2018/0336520 A1* | 11/2018 | Davis | ..... | G06Q 10/101 |
| 2019/0325012 A1* | 10/2019 | Delaney | ..... | G06F 40/279 |
| 2019/0355181 A1* | 11/2019 | Srinivasan | ..... | G06F 3/04815 |

* cited by examiner

SYSTEMS AND METHODS FOR COLLABORATIVE REAL-TIME GENERATION OF ELECTRONIC REAL ESTATE REPORTS

RELATED APPLICATION

This application claims priority to U.S. Provisional Application No. 62/731,669, filed Sep. 14, 2018, the disclosure of which is hereby incorporated by reference in its entirety.

TECHNICAL FIELD

Various embodiments of the present disclosure relate generally to methods and systems for enabling real-time collaborative generation of real estate reports.

BACKGROUND

Appraisers produce appraisal reports for lenders and other parties seeking appraisals on real estate property assets. In the United States and Canada, for example, appraisers produce reports in a specific format. For example, the standard financing form in the U.S. is the Fannie Mae Form 1004, known as the "Uniform Residential Appraisal Report."

Appraisers may complete the entire report themselves, but may also leverage the assistance of others. For example, an appraiser may have another person, such as a trainee, prepare part of the report for the appraiser to finish and co-sign. Appraisers may also leverage an assistant or a third-party data-entry service to fill out fields such as standard neighborhood descriptions or comparison data. Appraisers may also use third-party services that convert informal notes into a report.

Since appraisers may benefit from collaboration with others, such as trainees, assistants, third-party services, and inspectors and other appraisers working on the same appraisal, there is a need for computer-implemented methods and systems that would enable multiple users to concurrently edit an appraisal report in real-time. Such methods and systems would be beneficial in increasing the efficiency and accuracy of the appraisal report production process.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods are disclosed for enabling real-time collaborative generation of electronic real estate reports.

For instance, the method may include: generating a real estate appraisal report editable by a plurality of client devices, the appraisal report having a plurality of editable fields for describing a real estate property; and while the plurality of client devices are concurrently executing client applications enabling the appraisal report to be edited by respective users of the plurality of client devices, receiving, from a first client device among the plurality of client devices, an edit to a field among the plurality of editable fields, and in response to receiving the edit, transmitting, in real-time, the edit to a second client device among the plurality of client devices so that the edit to the field is displayed on the second client device in real time.

Furthermore, a computer system may include a memory storing instructions; and one or more processors to execute the instructions to perform operations. The operations include: generating a real estate appraisal report editable by a plurality of client devices, the appraisal report having a plurality of editable fields for describing a real estate property; and while the plurality of client devices are concurrently executing client applications enabling the appraisal report to be edited by respective users of the plurality of client devices, receiving, from a first client device among the plurality of client devices, an edit to a field among the plurality of editable fields, and in response to receiving the edit, transmitting, in real-time, the edit to a second client device among the plurality of client devices so that the edit to the field is displayed on the second client device in real time.

Furthermore, a non-transitory computer-readable medium storing instructions that, when executed by one or more processors, cause the one or more processors to perform a method for real-time collaborative production of real estate reports. The method includes: generating a real estate appraisal report editable by a plurality of client devices, the appraisal report having a plurality of editable fields for describing a real estate property; and while the plurality of client devices are concurrently executing client applications enabling the appraisal report to be edited by respective users of the plurality of client devices, receiving, from a first client device among the plurality of client devices, an edit to a field among the plurality of editable fields, and in response to receiving the edit, transmitting, in real-time, the edit to a second client device among the plurality of client devices so that the edit to the field is displayed on the second client device in real time.

Appraisers may complete the entire report themselves, but may also utilize the assistance of others. For example, an appraiser may have another person, such as a trainee, prepare part of the report for the appraiser to finish and co-sign. Appraisers may also utilize an assistant or a third-party data-entry service to fill out fields such as standard neighborhood descriptions or comparison data. Appraisers may also use third-party services that convert informal notes into a report.

Since appraisers may benefit from collaboration with others, such as trainees, assistants, third-party services, and other appraisers working on the same appraisal, there is a need for computer-implemented methods and systems that would enable multiple users to concurrently edit an appraisal report in real-time. Such methods and systems would be beneficial in increase the efficiency and accuracy of the appraisal report production process.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 3 illustrates an example of a report-writing interface by which a user of a user device having editing permission may generate and edit the appraisal report, according to one or more embodiments.

FIG. 4 illustrates an example of a report-type selection interface, according to one or more embodiments.

FIGS. 5A-5B illustrate an example of real-time concurrent editing of the appraisal report by multiple user clients, according to one or more embodiments.

DETAILED DESCRIPTION OF EMBODIMENTS

Various embodiments of the present disclosure relate generally to a method for enabling real-time, collaborative editing of a real estate report by multiple user devices.

In general, the present disclosure is directed to a method in which a computer system generates an electronic real estate appraisal report that is concurrently editable by multiple user devices. As will be discussed in more detail below, the computer system may "listen" for edits made to the appraisal report by any one of the user devices. Upon detecting an edit to the appraisal report made by one of the user devices, the computer system may then broadcast the edit to other user devices that have the report open, and/or that later open the report. Accordingly, the method permits multiple users to concurrently generate and edit the appraisal report in real-time, thereby facilitating collaboration in producing appraisal reports.

In this disclosure, the term "based on" means "based at least in part on." The term "one or more of," when preceding a list of items defined using the conjunction "and," denotes an alternative expression that may be satisfied by a single item in the list or a combination of items in the list. The term "or" is meant to be inclusive and means either, any, several, or all of the listed items. The singular forms "a," "an," and "the" include plural referents unless the context dictates otherwise. The term "exemplary" is used in the sense of "example" rather than "ideal."

In this disclosure, the term "appraisal" includes broader concepts of "valuation" and value analysis."

Figure 1A:
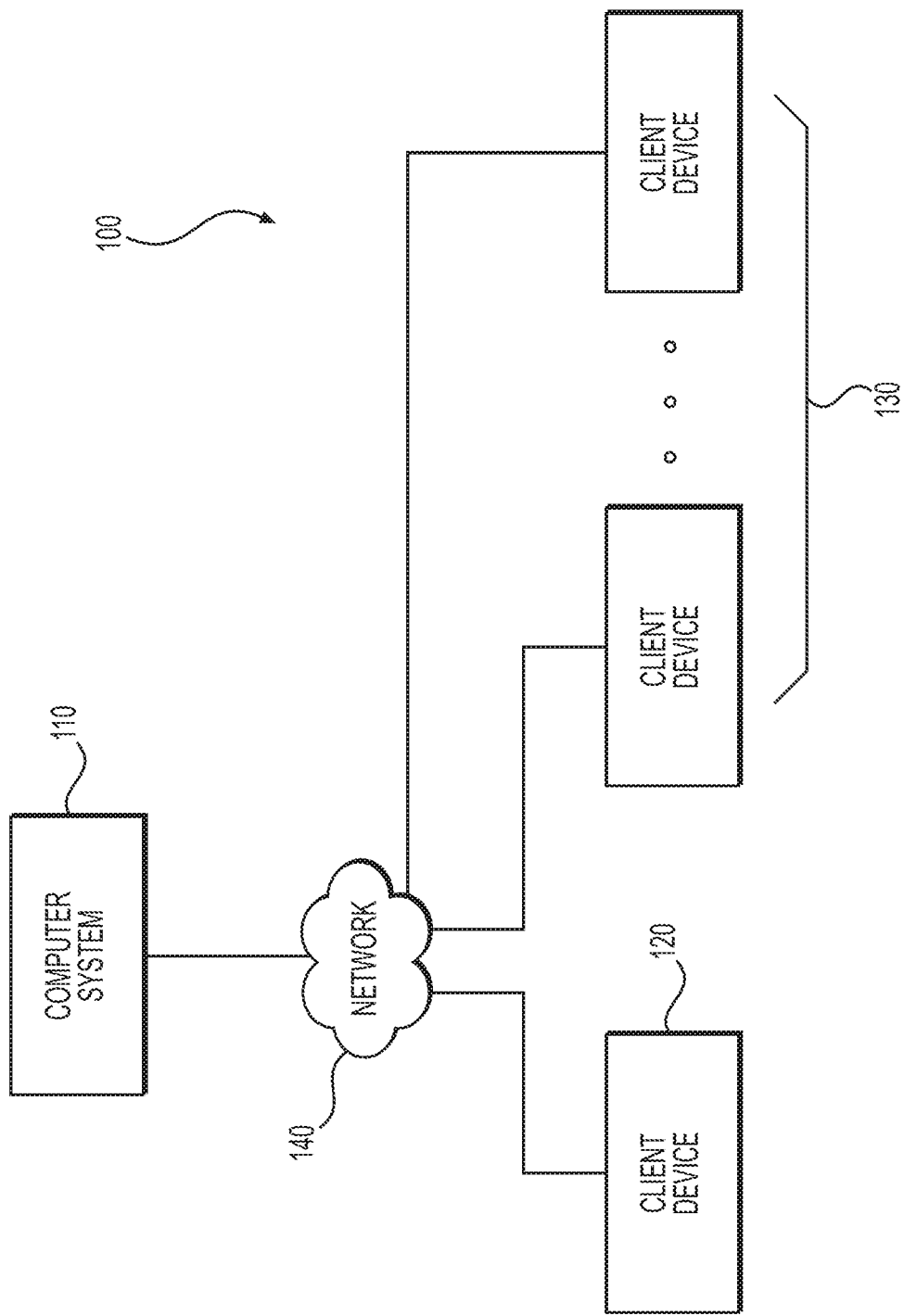
FIG. 1A depicts an exemplary system infrastructure for enabling real-time concurrent generation and editing of an electronic real estate report, according to one or more embodiments.

FIG. 1A illustrates a system 100 according to the present disclosure. The system 100 includes a computer system 110 connected to a client device 120 through a computer network 140. The system may also be connected to one or more other client devices 130 through the computer network 140. The computer system 110 may be a server configured to run an appraisal management service that is used by the client devices 120, 130. The computer system 110 may also be referred to herein as an appraisal management system or a report writing collaboration system. The computer system 110 may include a volatile memory, a non-volatile memory, and one or more processors. Client devices 120, 130 may be computing devices, such as, for example, a personal computer, a laptop computer, a cellular telephone, a smartphone, or a tablet computer.

Figure 1B:
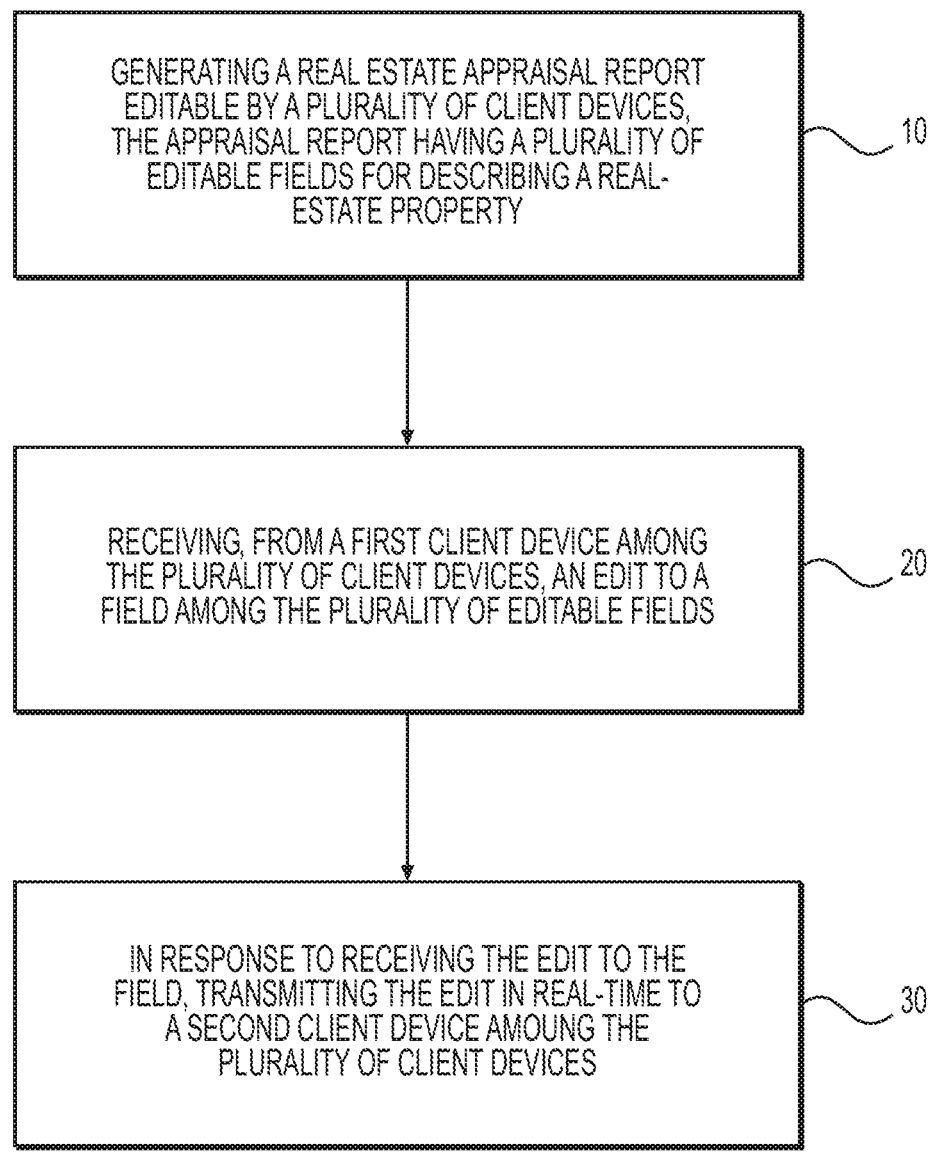
FIG. 1B depicts a method for enabling real-time concurrent editing of an electronic real estate report, according to one or more embodiments.

FIG. 1B shows a computer-implemented method for enabling real-time collaboration between the client devices 130 in writing and edit appraisal reports. The method may be performed by computer system 110 of FIG. 1A. The method may include: generating a real estate appraisal report editable by a plurality of client devices, the appraisal report having a plurality of editable fields for describing a real estate property (operation 10); receiving, from a first client device among the plurality of client devices, an edit to a field among the plurality of editable fields (operation 20); and, in response to receiving the edit to the field, transmitting the edit in real-time to a second client device among the plurality of client devices (operation 30). These operations, as well as other possible aspects of the method, will be discussed below. The generation of the real estate appraisal report (operation 10) may be initiated by receiving a user input, which may be sent from a client device and received by the computer system 110 performing the method.

Figure 2:
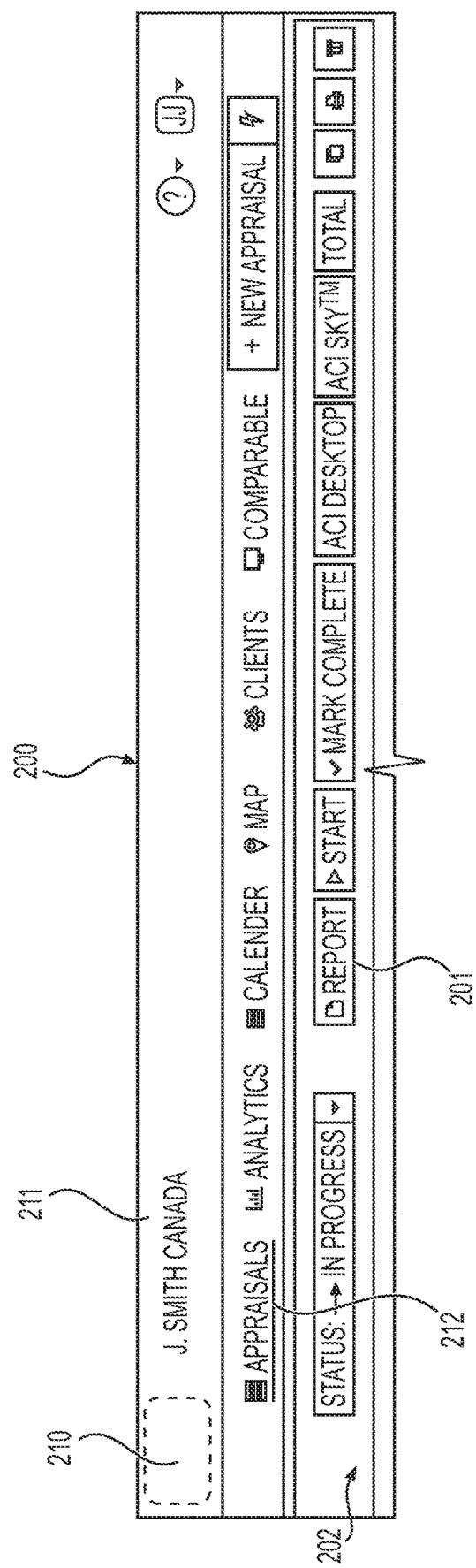
FIG. 2 illustrates an example of a user interface for initiating the generation of the real estate appraisal report, according to one or more embodiments.

FIG. 2 illustrates an example of a user interface 200 for initiating the generation of the real estate appraisal report. The illustrated user interface 200 is a user interface of the appraisal management service provided by the computer system 110 and may be displayed on the client device 120 by an application (such as a web browser) running on the client device 120. The user interface 200 may include a report button 201 enabling the user to open a report-writing interface, which is discussed below in more detail. For example, activation of the report button 201 may cause the client device 120 to transmit an input recognized by the computer system 110 as a request to open an existing report or generate the real estate appraisal report if a real estate appraisal report does not already exist.

The user interface 200 may include a logo 210 of the appraisal management service, and the name 211 of the user of the client device 120 who is currently logged into the service. The report button 201 may be part of an appraisal details page 202 displaying information of one or more appraisals associated with an account identifier of the user. Additionally, each appraisal may have a unique appraisal identifier (appraisal ID), and each report may have a unique appraisal report identifier (appraisal report ID). The computer system 110 may store associations between appraisal identifiers and account identifiers, as well as associations between appraisal identifiers and the identifiers of one or more appraisal reports.

An "appraisal" may refer to an appraisal order that is stored in the computer system 110. For example, using the appraisal management service, a lender may request an appraisal that eventually becomes assigned to an appraiser ID, which corresponds to an account of an appraiser. Each appraisal may be associated with an appraisal report in a one-to-many relation; that is, the computer system 110 may store multiple appraisal reports for each appraisal, and, accordingly, associate an appraisal identifier with one or more appraisal report identifiers in a database. Alternatively, the relationship between appraisals and appraisal reports may be one-to-one.

Once the appraisal report has been generated by the computer system 110, the fields of the appraisal report may be edited by any user device with permission to edit the appraisal report. In certain implementations discussed below, permission to edit the appraisal report may be determined based on whether the user device is subscribed to a channel used for editing of the report.

Figure 3:
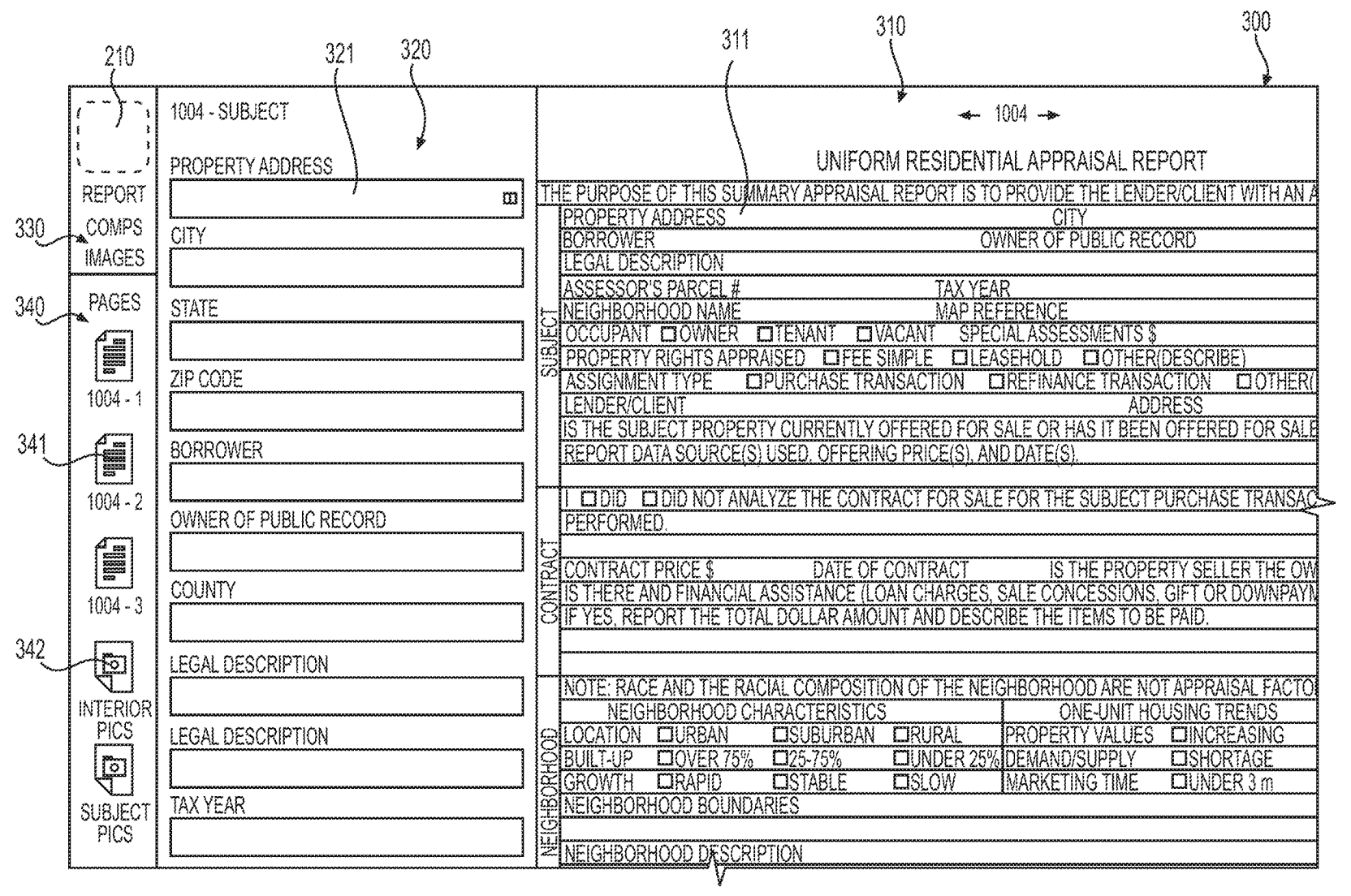

FIG. 3 illustrates an example of a report-writing interface 300 by which a user of a user device having editing permission may write and edit the appraisal report. Report-writing interface 300 may appear on the client device 120 as a result of triggering the report button 201. Report-writing interface 300 includes an appraisal report view 310 in which the appraisal report, along with its various fields for describing a real estate property, are displayed in a certain format. The combination of the report-writing interface 300 and functionalities provided by the computer system 110 for real-time collaborative editing may also be referred to as a report writer or appraisal report writing application.

As shown in the appraisal report view 310, the appraisal report generated by the computer system 110 includes a plurality of editable fields for describing a real estate property. For example, field 311 is a field for the property address of the real estate property to be appraised. The appraisal report may be in the format of the Uniform Residential Appraisal Report (Fannie Mae Form 1004) as shown in the figure, and may have any or all fields that are part of the Uniform Residential Appraisal Report. Field 311 and other fields displayed on the appraisal report view 310 may be text entry boxes permitting a user to input text. While not specifically illustrated in FIG. 3, these text entry boxes may have a certain visual characteristic, such as a shading, to distinguish them from white space on the form.

The computer system 110 may assist in filling out some of the fields, such as by pre-populating certain fields with already-available or automatically-accessible information when the report is first generated or upon receiving a user request to populate fields. As an example of already-available or automatically-accessible information, the computer system may have access to multiple listing service (MLS) data that is stored in a database of the computer system 110, or stored on an external source. Such data can be pre-populated or automatically inserted into fields of the appraisal report pertaining to comparable sales, the "comparable sale" grids of Form 1004. As another example of already-available information, the computer system 110 may have already received and stored various information, such as property address, the borrower, the legal description, the lender or client, and the contract price, resulting from usage of other functionalities of the appraisal management service. These fields may be specified, for example, at the time when an appraisal order is first created on the appraisal management service.

Additionally, the user may also apply a template or clone information from an old report. The user also has the option of starting fresh, with a blank form.

Report-writing interface 300 may also include a field-editing interface 320 having text entry boxes for any or all text fields of the appraisal report. For example, text entry box 321 is for the "property address" field, corresponding to field 311 of the appraisal form. The report-writing interface 300 may present the fields of the appraisal report in a layout different from that of the appraisal report view 310. For example, the report-writing interface 300 may present the fields in a less-cluttered manner, thereby improving the ease of editing the appraisal report.

Corresponding fields of the appraisal report view 310 and the field-editing interface 320 may be linked in that whenever a user is entering text into the text entry box 321, the entering of the text is automatically replicated in text entry box 311, and vice versa.

Report-writing interface 300 may also include a first menu 330 and a second menu 340 containing various items corresponding to various features of the interface. For example, first menu 330 may include a click item, shown as "report" in the figure, used to open a sub-interface permitting the user to adjust the report type. Second menu 340 may contains page selection icons 341 allowing the user to select different pages of the appraisal report. For example, the three page selection icons 341 may correspond to the three pages of the Fannie Mae Form 1004 with fillable fields. Second menu 340 may additionally contain icons 340 corresponding to features of the report-writing interface 300 enabling the user to upload photographs, floor plans, or other media to be attached to the appraisal report.

Figure 4:
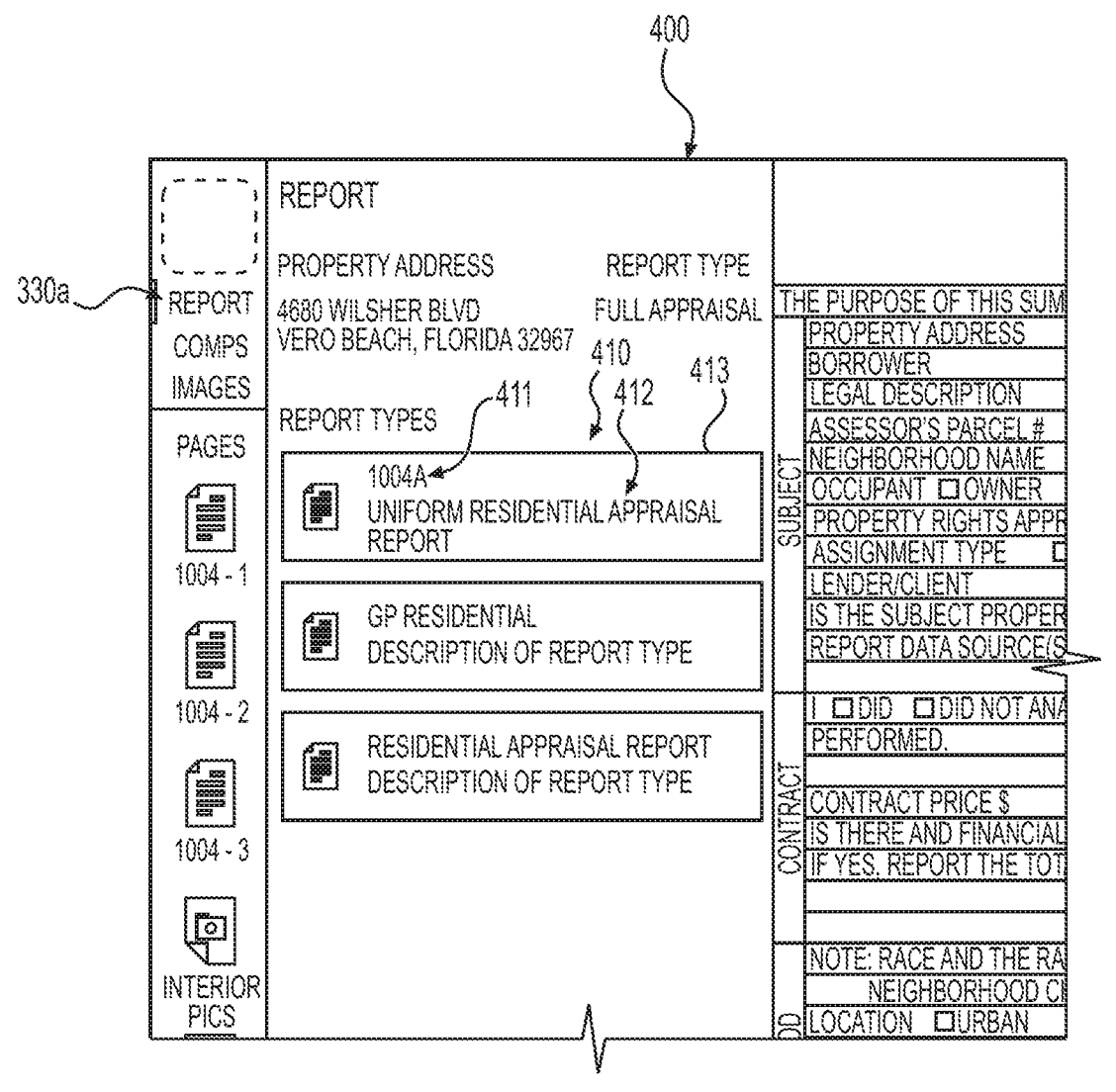

FIG. 4 illustrates an example of a report-type selection interface 400 that is displayed when the "report" item of the first menu 330 is triggered. The report-type selection interface 400 includes a list 410 of different report types, each identified by a name 411 and a description 412. The bolded frame 413 around the first item ("1004A") indicates that the appraisal report is currently set to that type. A report type may be delineated by the type of appraisal form. For example, a Fannie Mae Form 1004 and a GP Residential form may be considered to be distinct types of appraisal forms. When the report type is switched, the data may be retained in the new form if the old form has a field that is also used on the new firm.

Figure 5A:
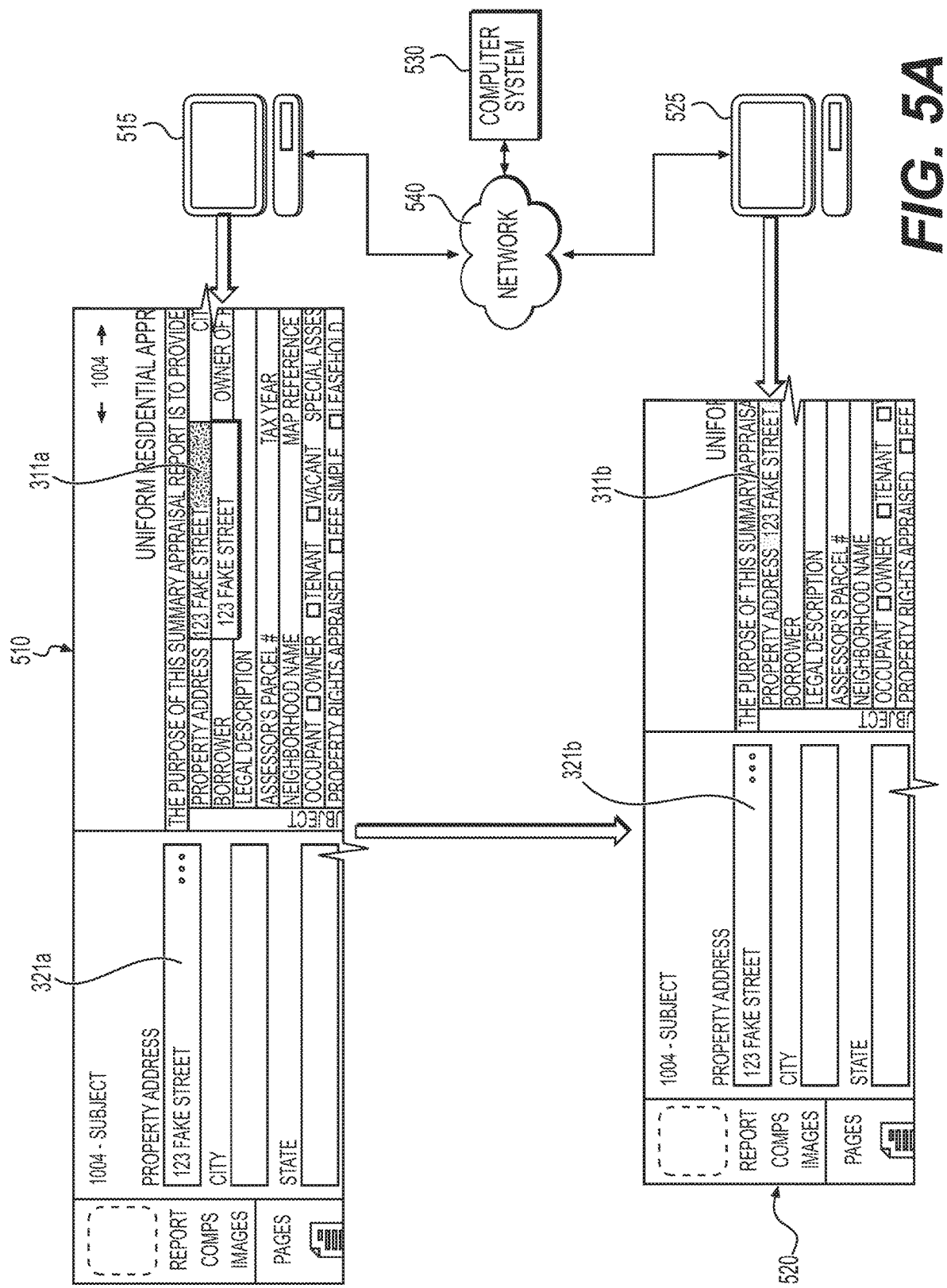
Figure 5B:
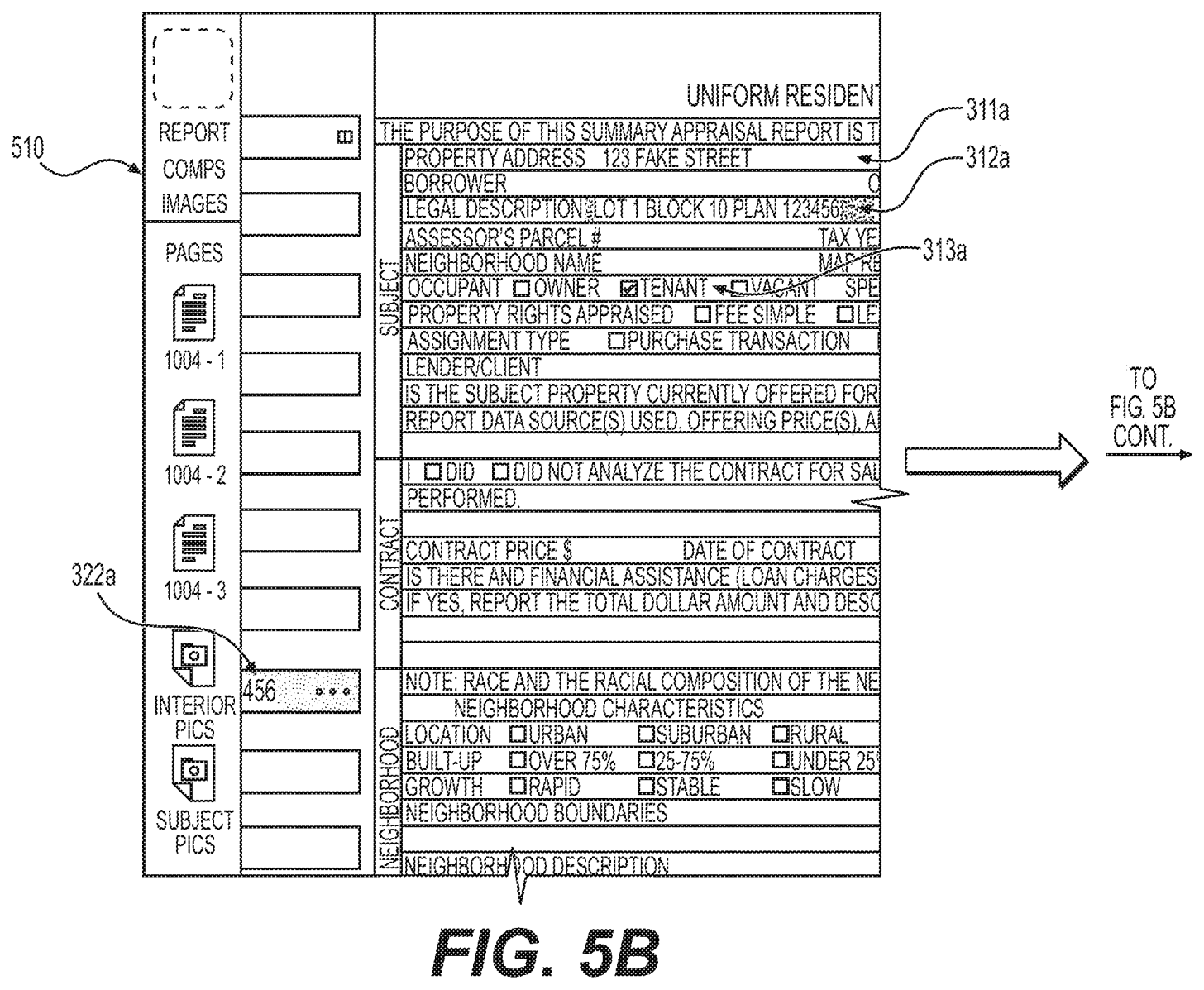
Figure 5B:
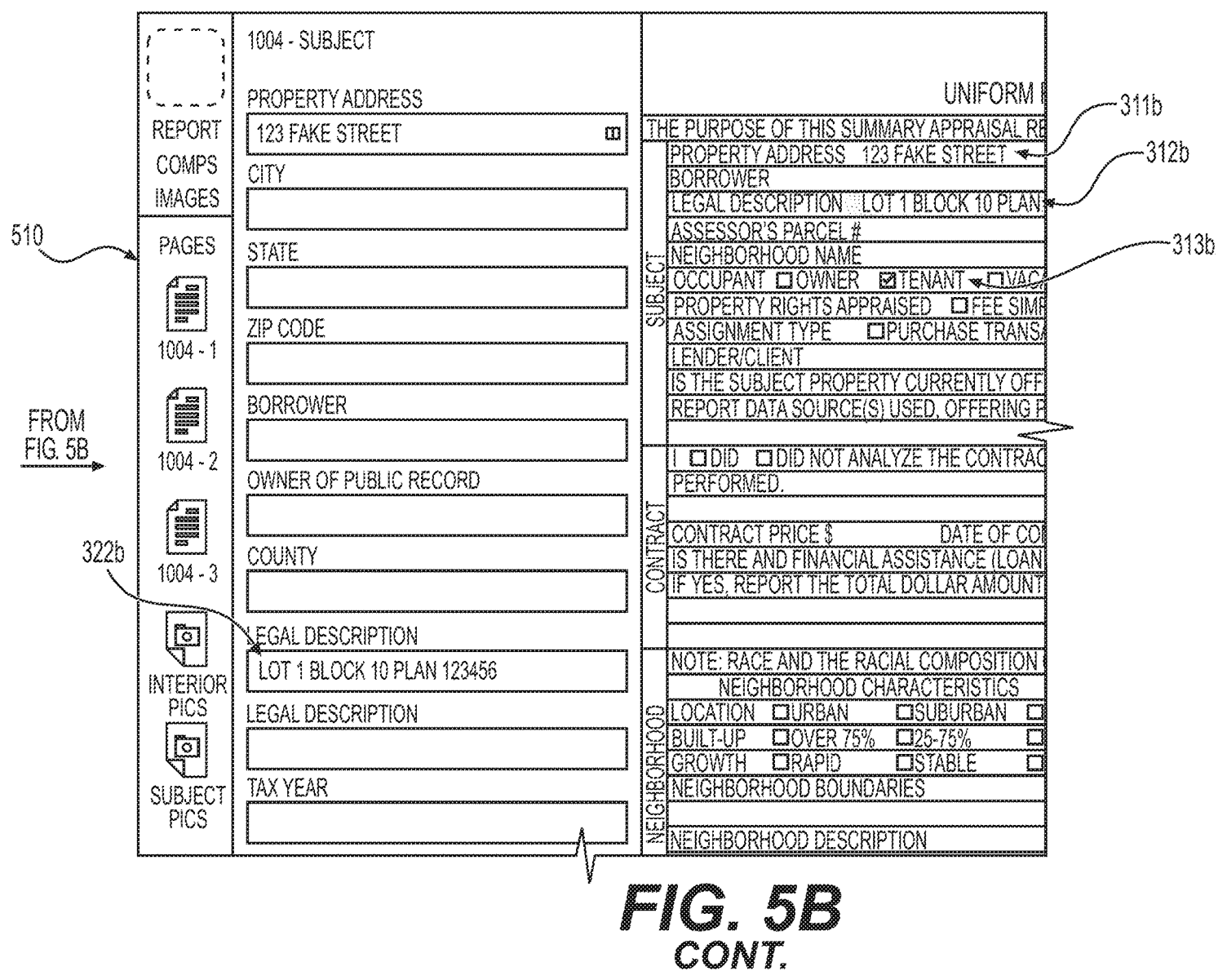

FIGS. 5A-5B illustrate examples of real-time concurrent editing of the appraisal report by multiple user clients. In FIG. 5A, computer system 110 is connected to a first client device 515 and a second client device 525 through a computer network 540. Report-writing interface 510 is being displayed on first client device 515, while report-writing interface 520 is concurrently being displayed on second client device 525.

Whenever a user of the first client device 515 edits a field of the appraisal report, such as the "property address" field, the edit is displayed in real-time on the report-writing interface 520 displayed on second client device 525. To implement this aspect, the computer system 110 receives, from the first client device 515, an edit to the field (operation 102 of FIG. 1). In response to receiving the edit to the field, the computer system 110 transmits the edit in real-time to the second client device 525 (operation 103 of FIG. 1). Accordingly, all of the data is shared across anyone viewing the report in real time, character by character.

Whenever the computer system 110 has detected that the user of the first user device 515 is currently typing in a field, the second user device 525 may indicate that the field is being edited by another user. For example, the second user device 525 may cause the text entry box 311*b* and/or text entry box 321*b* to be highlighted in a certain color, or other displayed in a manner visually distinct from other fields not being edited by another, to thereby indicate that the field is being edited by another. Additionally, the second user device 525 may lock out the user of the device from editing that field until the first user device 515 is no longer typing. For example, text entry box 311*b* and/or text entry box 321*b* may be set to be non-editable during this time. The disabling of edits to a certain field in such a manner may be triggered by the computer system's transmission of an edit to the field made by another user device, or transmission of a command to disable editing of the field.

In the example shown in FIG. 5A, the user of client device 515 edits text input box 311*a* or text input box 312*a* corresponding to the "property address," causing the computer system 110 to detect that client device 515 is currently editing the "property address" field. For example, as the user of client device 515 types out "123 Fake Street" into text input box 311*a* or text input box 312*a*, each character that is typed is transmitted to the computer system 110, which broadcasts the characters to the second client device 525 so that the second client device 525 displays the characters as they are being input on the first client device 515. Additionally, while the first client device 515 is being detected by the computer system 110 as currently editing the "property address" field, the computer system 110 controls or otherwise causes the second client device 525 to be locked out from editing text input box 311*b* and 312*b* until the computer system 110 detects that the first client device 515 is no longer editing the "property address" field.

Similarly, in FIG. 5B, as the user of the first client device 515 types in "Lot 1 block 10 Plan 123456" (for example) into text input box 312*a* or text input box 322*a*, the text input boxes 312*b*, 312*b* on the second client device 525 are updated in real-time and are locked from editing.

The behavior for the second client device 525 discussed above would apply to any other client device that is participating in the writing or editing of the appraisal report. That is, whenever a user is typing in a field, the client devices of all other users will indicate that someone is typing in the field and may also lock out their respective users from editing that specific field until the user that was typing has finished typing.

The computer system 110 may additionally provide validation tools for the users of user devices preparing the appraisal report. For example, the computer system 110 may check to see if: (1) the property has been previously appraised by the same organization to which the user of the client device belongs; (2) the comparable has been previously used within the organization; (3) there is a discrepancies from the data entered by the user and previously entered data (e.g., a previous appraiser indicated that a specific comparable was 1,500 square feet but the user of the client device inputs 1,200 square feet instead); and (4) certain parameters are above a set threshold (e.g., gross comparable adjustments are over 20% of the sale price). For example, the report-writing interface 300 or another interface may have a button enabling a user to send a validation request to the computer system 100, which, in response to receiving the validation request from the user device, checks one or more of the above scenarios. If the computer system 110 determines that any of the above scenarios are true, the computer system 110 may notify any user device editing the appraisal report with a corresponding notification. The computer system 110 may cause the user device to display the notification.

All comparables used in appraisal reports may be saved to an elastic search database of the computer 110, where they can be queried very quickly. With all of this data in elastic search, the computer system 110 can run automated adjustment rules through paired sales analysis. Once there are enough comparables in a certain area, the computer system 110 may notify any user device editing the appraisal report of adjustments that should be used by the user editing the appraisal report, such as square footage adjustments. These adjustments may be determined by the computer system 110 based on an automated backend paired sales analysis.

Figure 6:
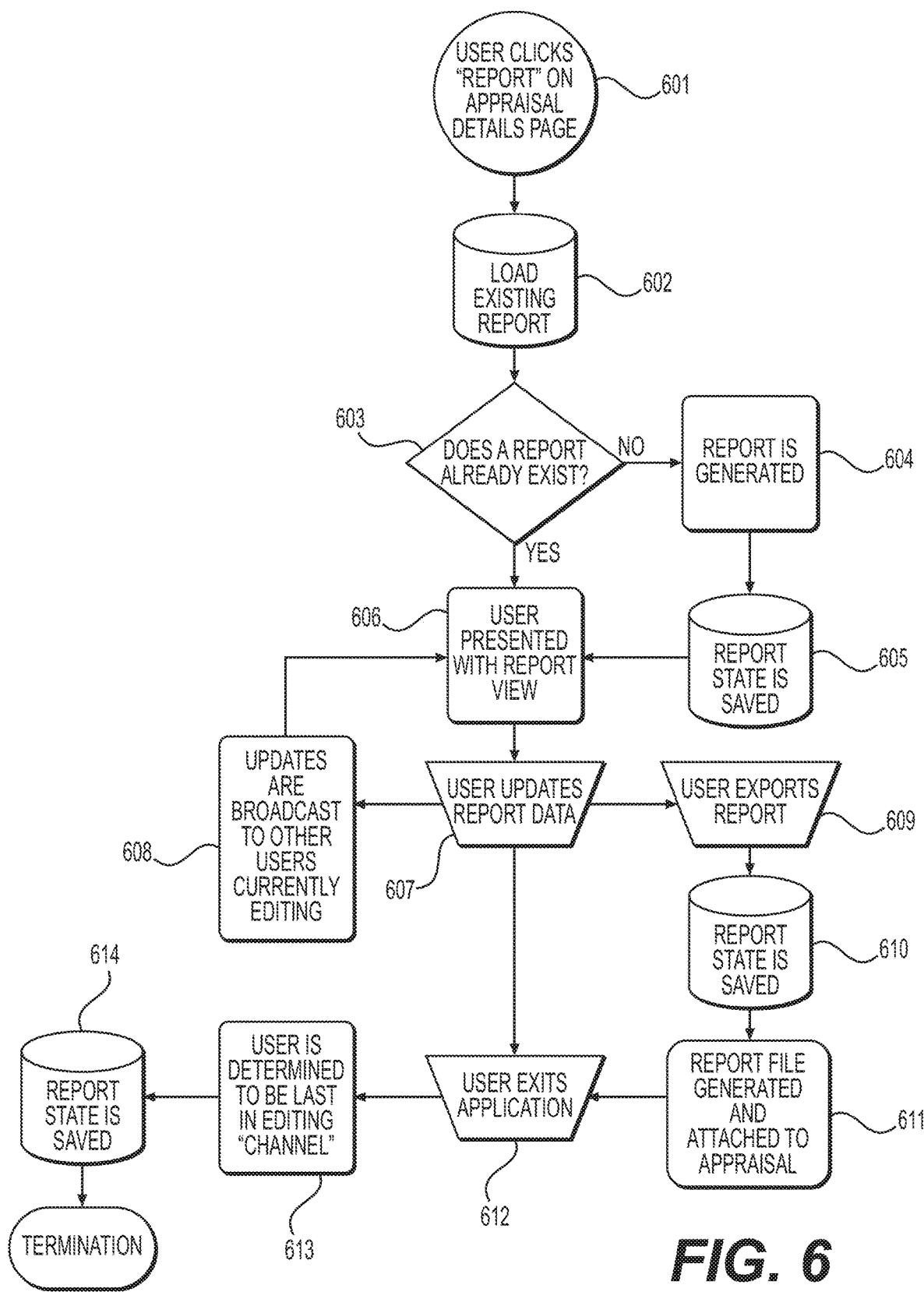
FIG. 6 is a flowchart that illustrating various operations associated with enabling real-time concurrent editing of an electronic real estate report, according to one or more embodiments.

FIG. 6 is a flowchart that illustrates the operations discussed above along with additional possible operations. In operation 601, the computer system receives a user input associated with an appraisal report feature. For example, the user clicks report button 201 on the appraisal details page 202 shown in FIG. 2, which sends a request received by the computer system.

Next, the computer system 110 loads an existing appraisal report (operation 602) and determines whether an appraisal report already exists (operation 603). Steps 602 and 603 may be performed as part of a single operation. For example, whether the loading of an existing appraisal report is successful or not may be used to determine whether an appraisal report already exists. In other implementations, the order of operations 602 and 603 may be switched, in that operation 602 may instead be an operation that follows from the "YES" branch of operation 603.

If the computer system 110 determines that the report does exist, the user is presented with a report view (operation 606), such as the report view 310 shown in FIG. 3. If the computer system 110 determines that an existing report does not exist for the appraisal, it generates a new appraisal report (operation 604). The generation of the report may be practically instantaneous, so that having multiple users will not be able to create multiple reports at the same time. If multiple users happen to click report button 201 at approximately the same time, the first command request by the computer system 110 results in report generation, and subsequent report requests from other user devices will results in the generated report loading on those user devices.

Next, the computer system 110 saves the report in at least one memory of the computer system (operation 605), and presents the generated report to the user device (operation 606). For example, the computer system 110 may transmit report data to the user device so that the user device loads the report view 310 shown in FIG. 3. If the user updates the appraisal report (operation 607) by, for example, editing a field of the report, the updates are broadcast to other users currently editing the report (operation 608).

The user may export the report (operation 609). For this operation, the user may select a desired output format (such as a PDF format or a file format used by other report writing software). In response to the user request to export the report, the computer system saves the report (operation 610) and generates and attaches the report file to the appraisal (operation 611). When the user exits the application and the computer system 110 determines that the user was the last user editing the report (operation 613), the report state is saved (614). The determination of whether the user who has exited the application was the last user editing the report may be based on whether there are any other users remaining in a certain editing channel, which is discussed in more detail below. If the computer system 110 determines that there are no remaining users in the channel, then it may proceed to saving the report. In operation 614, the report may be saved to a non-volatile memory.

An appraisal report generated by the computer system 110 may be stored as two separate models: a metadata model containing metadata on the report configuration, and a data model containing the data of the report.

Figure 7A:
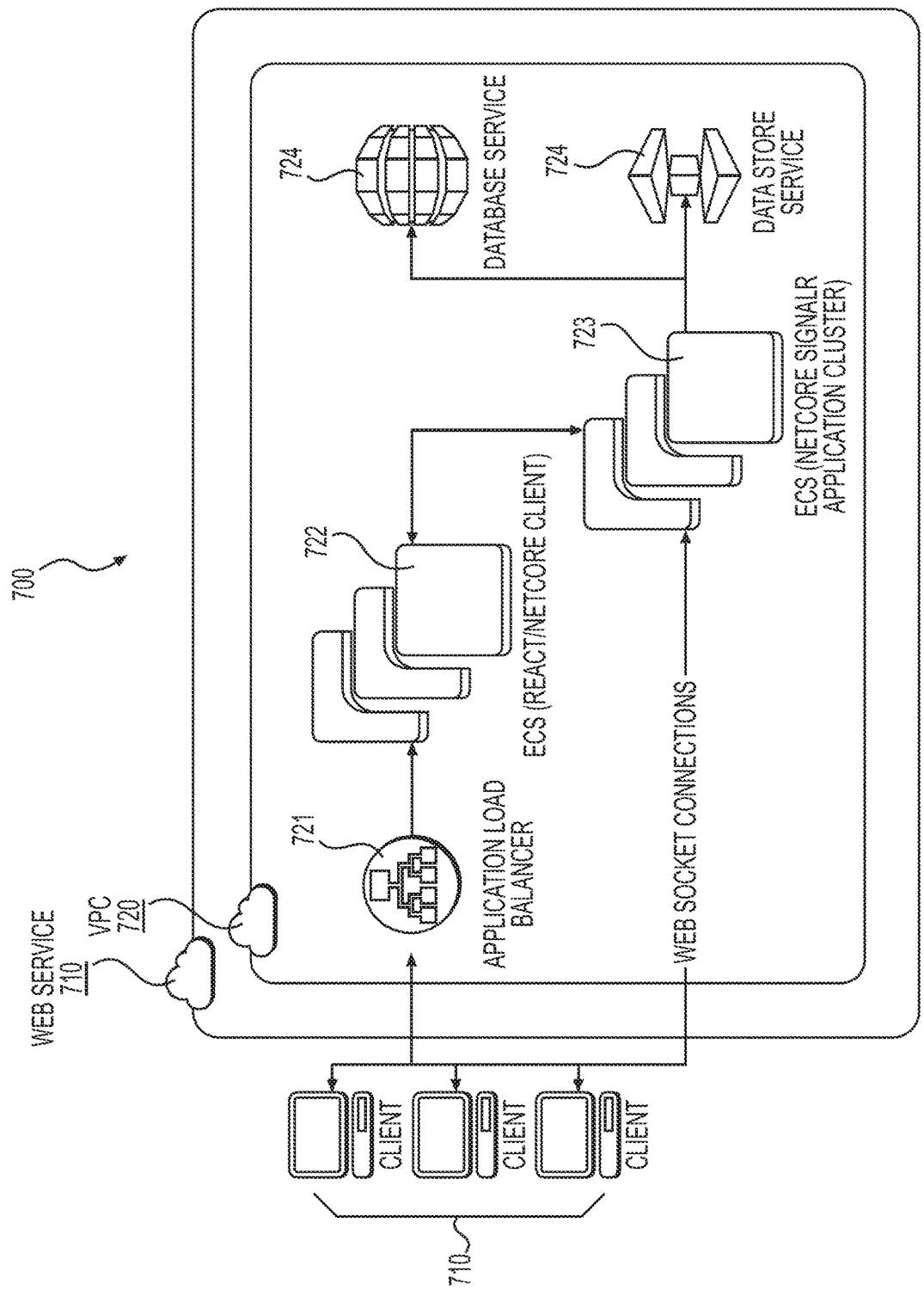
FIGS. 7A-7B illustrate an exemplary system and architecture diagram of the system previously illustrated in FIG. 1A, as well as example operations of the system, according to one or more embodiments.

FIG. 7A illustrates an example implementation of the system 100 shown in FIG. 1A. FIG. 7A illustrates a system 700 comprising a web service 710 running a virtual private cloud (VPC) 720. The web service 710 may be a service that provides a virtual private cloud, such as Amazon Web Service (AWS).

The VPC 720, together with hardware components such as processors and memory used to run the VPC 720, is an example implementation of the computer system 110 illustrated in FIG. 1A. The VPC 720 may include an application load balancer 721, a first elastic container service (ECS) 722, a second elastic container service (ECS) 723, a database service 724, and a data store service 724. Client devices 710 (corresponding to client devices 120, 130 of FIG. 1A) are connected to the VPC 720 over a computer network, and may specifically be connected to application load balancer 721, the first ECS 722, and the second ECS 723.

The first ECS 722 may be an ECS that is running a React/NetCore application that provides user interface elements (such as the user interface elements shown in FIGS. 2 though 5B) while being connected to a back-end application. The back-end application may be a SignalR back-end application handled by NetCore applications run by the second ECS 723.

The first ECS 722 and second ECS 723 may each comprise a plurality of elastic compute cloud (EC2) instances. Additionally, the VPC 720 may have multiple instances of the first ECS 722 and multiple instances of the second ECS 723. The initial connection of the client devices 710 with the VPC 720 may pass through application load balancer 721, which chooses server instances for the various client devices 710. Server instance sessions may be sticky and persistent for a client device. Therefore, different server instances may be serving different client devices or different groups of client devices. In this context, "sever instance" may be understood as any combination of EC2 and ECS instances that act as a server for a client device.

The database service 724 may be a non-volatile database service with object persistence. For example, the database service 724 may be DynamoDB provided by Amazon Web Service. The data store service 724 may be a volatile data storage and may be running an in-memory caching engine such as Redis. Data store service 724 may particularly be a fully managed in-memory data store such as Amazon ElastiCache and Amazon ElastiCache for Redis.

The task of synchronizing appraisal report data between users may be handled by NetCores application hosting SignalR hubs. These hubs, running on second ECS 723, may load initial data from the database service 724 (e.g., DynamoDB), and persist user data across multiple containers using Redis caching. While SignalR technology may be used to deliver messages between client machines and a hub server, Redis Pub/Sub technology may be used to broadcast messages between server instances.

Figure 7B:
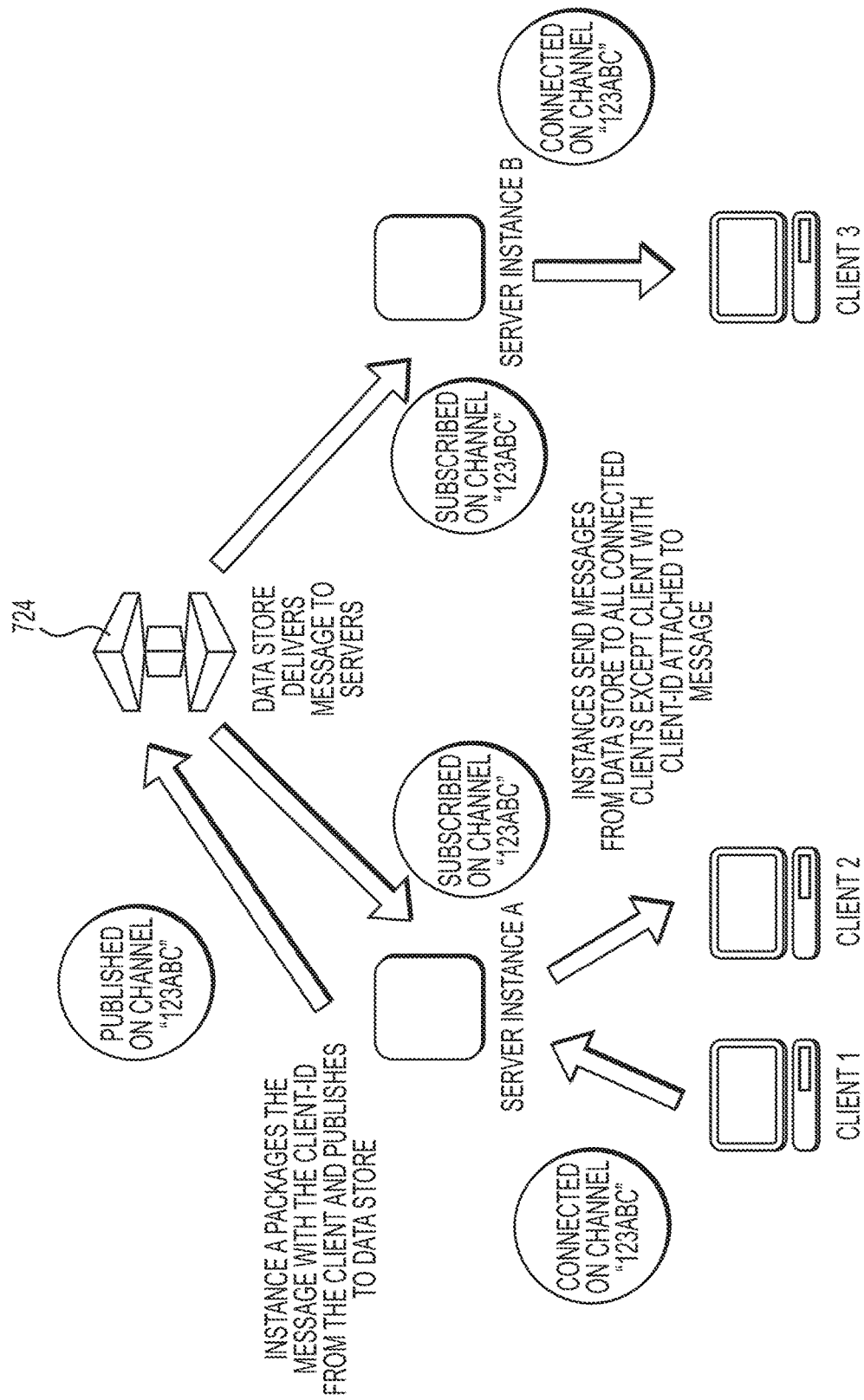

FIG. 7B illustrates an example operation of the system shown in FIG. 7A. In FIG. 7B, client devices (client 1, client 2, and client 3) connect to SignalR Hubs on a "channel." As noted earlier, an appraisal may have a unique identifier known before the report is started. This unique identifier may be used by all clients wishing to edit a report when they request to join an editing channel. The editing channel may have an identifier that corresponds to the identifier of the appraisal; for example, the editing channel may have an identifier that is derived from the identifier of the appraisal. For example, if the appraisal has the identifier "123ABC," any client application making a request to edit the report for this appraisal may ask for the channel corresponding to this appraisal identifier. In the example illustrated in FIG. 7B, the channel identifier is also "123ABC." The system 700 of FIG. 7A may be configured such that client devices are permitted to be connected to only a single channel at a time. The functions of the data store 724 shown in FIG. 7B may be implemented by Redis, for example.

The use of channels is also supported by the data store service 724. Using Redis as an example of a feature of the data store service 720, the server instances A and B shown in FIG. 7B may subscribe and listen for messages on all Redis channels for which the server instances are currently running SignalR channels. Incoming messages on SignalR channels are subsequently published on Redis channels. All servers subscribed to that channel will receive the message, including the initiating server. The servers then deliver the message to all clients connected to that channel; in certain implementations, the client that is the message originator may be specifically excluded from the delivery of the message.

Figure 8:
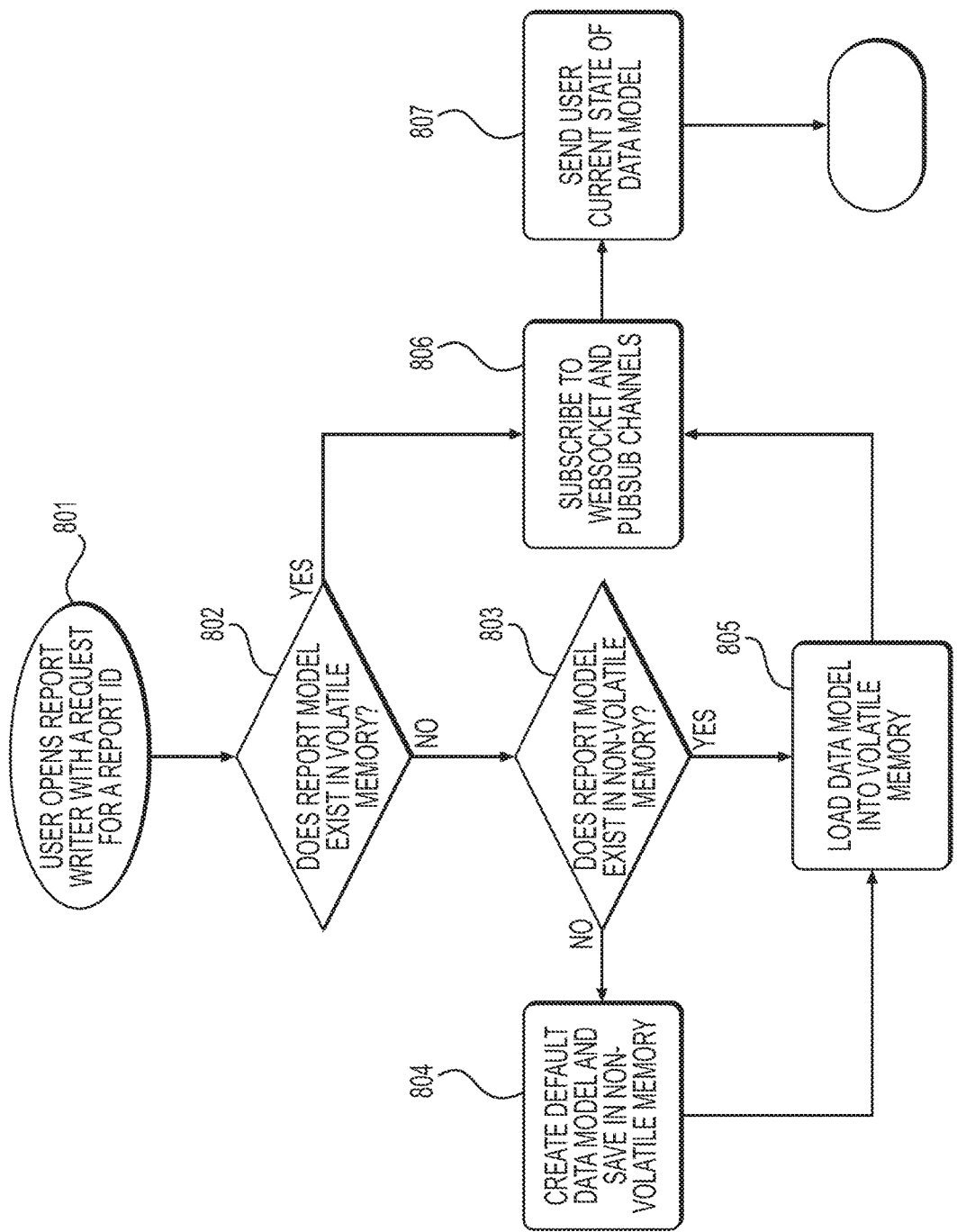
FIG. 8 illustrates a method of loading a data model of an appraisal, according to one or more embodiments, according to one or more embodiments.

FIG. 8 illustrates a method of loading a data model of an appraisal report in the situation in which a first user device creates a channel in the application by creating a new report instance, and a second user arrives at the application and requests to join the channel.

In operation 801, the user device opens a report associated with a particular report identifier. The user device may send a request including a report identifier; alternatively, the report identifier may be implied by the context (for example, when there is only one report). In response to receiving the request, the computer system 110 determines whether the report model exists in volatile memory (operation 802). In more detail, when the client device makes a request to begin an editing session for a specific report identifier, the computer system 110 checks the volatile memory of the computer system 110 to try to load the report from there first. If the report is found in volatile memory, it means that an editing instance is already in progress. The volatile memory and non-volatile memory in FIG. 8 may be respectively implemented by data store service 724 and database service 724 illustrated in FIG. 7A.

If the computer system 110 determines that the report model does exist in volatile memory, the computer system 110 may subscribe the client device to one or more channels (e.g., websocket and Pub/Sub channels) by which the model data is transmitted to the client device in real-time (operation 806). When data is sent on the basis on subscriptions, such as push notifications, it may be beneficial to subscribe the client device to the one or more channels before the initial state of the report model is sent to the client device. Otherwise, for the duration it takes for the asynchronous call to return to the initial state, the user may miss an update to the data model broadcast by the computer system 110.

If the computer system 110 determines that the report model does exist in volatile memory, the computer system may then determine whether the report model exists in non-volatile memory (operation 803). If the report model does exist in non-volatile memory, the computer system 110 loads the data model into volatile memory (805), and proceeds to operation 806 discussed above. Otherwise, the computer system 110 creates a default data model for a new appraisal report and saves it in non-volatile memory (operation 804), before proceeding with operation (805).

Figure 9:
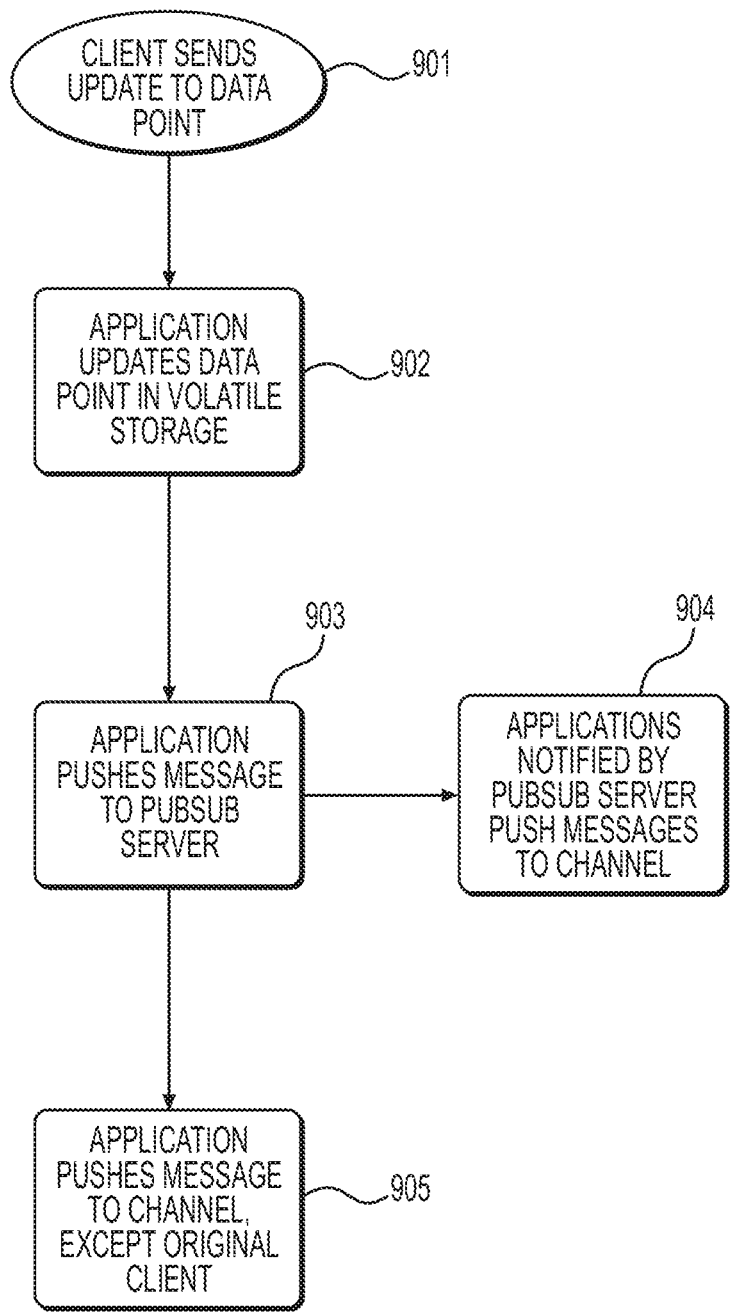
FIG. 9 illustrates a method of updating data models when a user makes an update to a single data point, according to one or more embodiments.

FIG. 9 illustrates a method of updating data models when a user makes an update to a single data point. The data point may be a data point of the data model of the appraisal report. In general, when a user updates a data point, the new data may be sent to the backend application for processing. The backend application may update the data model in volatile storage, and then publish the message to the Pub/Sub server and to other members of the channel.

In operation 901, a client device sends an update to a data point of the data model. In response to receiving the update from the client device, the backend application run by the computer system 110 updates the data point in volatile storage (operation 902). Then, the computer system 110 publishes the update on a Pub/Sub server, so that applications notified by the Pub/Sub server push the message to the channel (operation 904), and the backend application pushes the message to a channel.

As discussed above, the methods according to this disclosure enable real-time, concurrent editing of a real estate report by multiple user devices. Accordingly, collaborative production of appraisal reports can be facilitated.

Any data or information that is shown in a graphical user interface of this disclosure may be stored in the computer system 110, and any data or information that a user may input using a graphical user interface of this disclosure may be received by the computer system 110 and stored in the computer system 110. The computer system 110 may be configured to generate the graphical user interfaces in a format displayable on a web browser.

The method described herein may be performed by one or more processors that accept computer-readable (also called machine-readable) code containing a set of instructions that when executed by one or more of the processors carry out at least one of the methods described herein. The one or more processors may include any processor capable of executing a set of instructions (sequential or otherwise) that specify actions to be taken are included.

In one or more embodiments, the one or more processors may be included in a processing system. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The memory as used herein, if clear from the context and unless explicitly stated otherwise, also encompasses a storage system such as a disk drive. The processing system in some configurations may include a sound output device, and a network interface device. The memory subsystem thus includes a computer-readable carrier medium that carries computer-readable code (e.g., software) including a set of instructions to cause performing, when executed by one or more processors, one or more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code. Furthermore, a computer-readable storage medium may form, or be included in a computer program product.

The processing system discussed in the preceding paragraph may be computer system 110 shown in FIG. 1A.

In other embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Thus, one embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium may be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to include, but not be limited to, solid-state memories, a computer product embodied in optical and magnetic media; a medium bearing a propagated signal detectable by at least one processor of one or more processors and representing a set of instructions that, when executed, implement a method; and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

It should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. Functionality may be added or deleted from the block diagrams and operations may be interchanged among functional blocks. Steps may be added or deleted to methods described within the scope of the present invention.

What is claimed is:

1. A computer-implemented method for real-time collaborative production of real estate reports, the method being performed by a computer system, the method comprising:
   generating a real estate appraisal report that includes a plurality of editable fields describing a real estate property, wherein at least one of the editable fields of the plurality of editable fields is pre-populated with information associated with the real estate property including one or more of: a property address, borrower identifiers, lender identifiers, client identifiers, or a contract price;
   identifying a plurality of client devices executing a client application configured to enable the plurality of client devices to concurrently edit the real estate appraisal report;
   based on the identifying of the plurality of client devices, enabling the real estate appraisal report to be concurrently edited by each of the plurality of client devices;
   receiving, from a first client device among the plurality of client devices, an edit to one or more fields of the at least one of the plurality of editable fields of the real estate appraisal report that is pre-populated with the information associated with the real estate property;
   accessing, on a real estate database service that is separate from the real estate appraisal report and from the plurality of client devices, known information corresponding to the one or more fields for which the edit was received, wherein the known information was generated independently of the real estate appraisal report;
   comparing (i) the received edit to the one or more fields to (ii) the known information corresponding to the real estate property to determine whether a discrepancy exists between the received edit and the known information; and
   in response to determining that a discrepancy does not exist between the received edit and the known information, transmitting, in real-time, the received edit to a second client device among the plurality of client devices so that the edit to the one or more fields is displayed on the second client device in real time.

2. The method according to claim 1, further comprising:
   determining that at least the first client device and the second client device of the plurality of client devices are concurrently editing the real estate appraisal report;
   detecting that the edit to the one or more fields is in progress by the first client device; and
   in response to detecting that the edit is in progress, causing editing of the one or more fields on the second client device to be disabled until the second client device has received and displayed the edit.

3. The method according to claim 1, further comprising:
   receiving a command from the first client device to open a report associated with a real estate appraisal; and
   determining that no report associated with the real estate appraisal currently exists in the computer system,
   wherein the generating the real estate appraisal report is in response to the determining that no report associated with the real estate appraisal currently exists in the computer system.

4. The method according to claim 1, comprising:
   creating a channel corresponding to the real estate appraisal report;
   subscribing each of the plurality of client devices to the channel;
   receiving the edit to the one or more fields as an incoming message received on the channel; and
   in response to receiving the edit, broadcasting the edit through the channel to each of the plurality client devices other than the first client device.

5. The method according to claim 4, further comprising:
   receiving a command from another client device to open the real estate appraisal report;
   in response to the receiving the command, determining that data of the real estate appraisal report is stored in a volatile memory of the computer system; and in response to determining that the data of the real estate appraisal report is stored in the volatile memory of the computer system, subscribing the another client device to the channel.

6. The method according to claim 4, further comprising: determining that no client device are on the channel; and saving the real estate appraisal report in a non-volatile memory of the computer system, in response to the determining that no client device are on the channel.

7. The method according to claim 1, further comprising: after the generating the real estate appraisal report, retrieving multiple listing service (MLS) data and inserting the MLS data into a portion of the plurality of editable fields.

8. A computer system for real-time collaborative production of real estate reports, comprising:
a memory storing instructions; and
one or more processors to execute the instructions to perform operations including:
generating a real estate appraisal report that includes a plurality of editable fields describing a real estate property, wherein at least one of the editable fields of the plurality of editable fields is pre-populated with information associated with the real estate property including one or more of: a property address, borrower identifiers, lender identifiers, client identifiers, or a contract price;
identifying a plurality of client devices executing a client application configured to enable the plurality of client devices to concurrently edit the real estate appraisal report;
based on the identifying of the plurality of client devices, enabling the real estate appraisal report to be concurrently edited by each of the plurality of client devices;
receiving, from a first client device among the plurality of client devices, an edit to one or more fields of the at least one of the plurality of editable fields of the real estate appraisal report that is pre-populated with the information associated with the real estate property;
accessing, on a real estate database service that is separate from the real estate appraisal report and from the plurality of client devices, known information corresponding to the one or more fields for which the edit was received, wherein the known information was generated independently of the real estate appraisal report;
comparing (i) the received edit to the one or more fields to (ii) the known information corresponding to the real estate property to determine whether a discrepancy exists between the received edit and the known information; and
in response to determining that a discrepancy does not exist between the received edit and the known information, transmitting, in real-time, the received edit to a second client device among the plurality of client devices so that the edit to the one or more fields is displayed on the second client device in real time.

9. The computer system according to claim 8, where the operations further include:
determining that at least the first client device and the second client device of the plurality of client devices are concurrently editing the real estate appraisal report;
detecting that the edit to the one or more fields is in progress by the first client device; and
in response to detecting that the edit is in progress, causing editing of the one or more fields on the second client device to be disabled until the second client device has received and displayed the edit.

10. The computer system according to claim 8, wherein the operations further comprise:
receiving a command from the first client device to open a report associated with a real estate appraisal; and
determining that no report associated with the real estate appraisal currently exists in the computer system,
wherein the generating the real estate appraisal report is in response to the determining that no report associated with the real estate appraisal currently exists in the computer system.

11. The computer system according to claim 8, wherein the operations comprise:
creating a channel corresponding to the real estate appraisal report;
subscribing each of the plurality of client devices to the channel;
receiving the edit to the field as an incoming message received on the channel; and
in response to receiving the edit, broadcasting the edit through the channel to each of the plurality client devices other than the first client device.

12. The computer system according to claim 11, wherein the operations further comprise:
receiving a command from another client device to open the real estate appraisal report;
in response to the receiving the command, determining that data of the real estate appraisal report is stored in a volatile memory of the computer system; and
in response to determining that the data of the real estate appraisal report is stored in the volatile memory of the computer system, subscribing the another client device to the channel.

13. The computer system according to claim 11, wherein the operations further include:
determining that no client device are on the channel; and
saving the real estate appraisal report in a non-volatile memory of the computer system, in response to the determining that no client device are on the channel.

14. The computer system according to claim 8, wherein the operations further include:
after the generating the real estate appraisal report, retrieving multiple listing service (MLS) data and inserting the MLS data into a portion of the plurality of editable fields.

15. A non-transitory computer-readable medium storing instructions that, when executed by one or more processors, cause the one or more processors to perform a method for real-time collaborative production of real estate reports, the method comprising:
generating a real estate appraisal report that includes a plurality of editable fields describing a real estate property, wherein at least one of the editable fields of the plurality of editable fields is pre-populated with information associated with the real estate property including one or more of: a property address, borrower identifiers, lender identifiers, client identifiers, or a contract price;
identifying a plurality of client devices executing a client application configured to enable the plurality of client devices to concurrently edit the real estate appraisal report;

based on the identifying of the plurality of client devices, enabling the real estate appraisal report to be concurrently edited by each of the plurality of client devices;

receiving, from a first client device among the plurality of client devices, an edit to one or more fields of the at least one of the plurality of editable fields of the real estate appraisal report that is pre-populated with the information associated with the real estate property;

accessing, on a real estate database service that is separate from the real estate appraisal report and from the plurality of client devices, known information corresponding to the one or more fields for which the edit was received, wherein the known information corresponding to the real estate property was generated independently of the real estate appraisal report;

accessing, on a real estate database service that is separate from the real estate appraisal report and from the plurality of client devices, known information corresponding to the one or more fields for which the edit was received, wherein the known information corresponding to the real estate property was generated independently of the real estate appraisal report;

comparing (i) the received edit to the one or more fields to (ii) the known information to determine whether a discrepancy exists between the received edit and the known information; and in response to determining that a discrepancy does not exist between the received edit and the known information, transmitting, in real-time, the received edit to a second client device among the plurality of client devices so that the edit to the one or more fields is displayed on the second client device in real time.

16. The non-transitory computer-readable medium according to claim 15, wherein the method further comprises:

determining that at least the first client device and the second client device of the plurality of client devices are concurrently editing the real estate appraisal report:

detecting that the edit to the one or more fields is in progress by the first client device; and in response to detecting that the edit is in progress, causing editing of the field on the second client device to be disabled until the second client device has received and displayed the edit.

17. The non-transitory computer-readable medium according to claim 15, wherein the method further comprises:

receiving a command from the first client device to open a report associated with an appraisal; and determining that no report associated with the appraisal currently exists in a memory operatively connected to the one or more processors;

wherein the generating the real estate appraisal report is in response to the determining that no report associated with the appraisal currently exists in the memory operatively connected to the one or more processors.

18. The non-transitory computer-readable medium according to claim 15, wherein the method comprises:

creating a channel corresponding to the real estate appraisal report;

subscribing each of the plurality of client devices to the channel;

receiving the edit to the one or more fields as an incoming message received on the channel; and in response to receiving the edit, broadcasting the edit through the channel to each of the plurality client devices other than the first client device.

19. The non-transitory computer-readable medium according to claim 18, wherein the method further comprises:

receiving a command from another client device to open the real estate appraisal report;

in response to the receiving the command, determining that data of the real estate appraisal report is stored in a volatile memory of the memory operatively connected to the one or more processors; and in response to determining that the data of the real estate appraisal report is stored in the volatile memory, subscribing the another client device to the channel.

20. The non-transitory computer-readable medium according to claim 18, wherein the method further comprises:

determining that no client device are on the channel; and saving the real estate report in a non-volatile memory of the memory operatively connected to the one or more processors, in response to the determining that no client device are on the channel.

\* \* \* \* \*